(12) United States Patent
Tsutsumi et al.

(10) Patent No.: US 9,123,475 B2
(45) Date of Patent: *Sep. 1, 2015

(54) ELECTRIC STORAGE DEVICE PROVIDED WITH CURRENT COLLECTING MEMBER, AND METHOD FOR MANUFACTURING CURRENT COLLECTING MEMBER

(71) Applicant: GS Yuasa International Ltd., Kyoto-shi (JP)

(72) Inventors: Masakazu Tsutsumi, Kyoto (JP); Motoki Hoshino, Kyoto (JP); Jun Nakamura, Kyoto (JP); Shinsuke Yoshitake, Kyoto (JP); Takeshi Sasaki, Kyoto (JP); Akihiko Miyazaki, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,590

(22) Filed: Aug. 15, 2014

(65) Prior Publication Data

US 2015/0024244 A1 Jan. 22, 2015

Related U.S. Application Data

(62) Division of application No. 13/515,849, filed as application No. PCT/JP2011/067103 on Jul. 27, 2011, now Pat. No. 8,828,590.

(30) Foreign Application Priority Data

Aug. 19, 2010 (JP) ................................. 2010-184043
Sep. 30, 2010 (JP) ................................. 2010-222660

(51) Int. Cl.
*H01M 2/26* (2006.01)
*H01M 4/02* (2006.01)
(Continued)

(52) U.S. Cl.
CPC .............. *H01G 11/66* (2013.01); *H01G 11/06* (2013.01); *H01G 11/24* (2013.01); *H01G 11/70* (2013.01);
(Continued)

(58) Field of Classification Search
USPC .................................................. 429/211, 161
See application file for complete search history.

(56) References Cited

U.S. PATENT DOCUMENTS 7,736,797 B2  6/2010  Kim et al.
2006/0051664 A1  3/2006  Tasai et al.
(Continued)

FOREIGN PATENT DOCUMENTS

CN    1893160 A    1/2007
JP    2002-100340 A    4/2002
(Continued)

OTHER PUBLICATIONS

U.S. Notice of Allowance dated May 7, 2014 in co-pending U.S. Appl. No. 13/515,849.
(Continued)

*Primary Examiner* — Ula C Ruddock
*Assistant Examiner* — Osei Amponsah
(74) *Attorney, Agent, or Firm* — McGinn IP Law Group, PLLC

(57) ABSTRACT

An electric storage device includes a case, an electrode assembly housed in the case and including a positive electrode plate and a negative electrode plate which are wound together while being isolated from each other, an external terminal arranged outside the case and a current collecting member arranged inside the case to electrically connect the electrode assembly with the external terminal. The current collecting member includes a first portion including a first end portion and a second end portion, and electrically connected to the external terminal, and a second portion extending out of the second end portion of the first portion and electrically connected to the electrode assembly. The second portion includes a base portion including a first end portion and a second end portion, the first end portion of the base portion being connected to the second end portion of the first portion, and a twisted portion.

8 Claims, 13 Drawing Sheets

(51) Int. Cl.
  *H01G 11/66* (2013.01)
  *H01G 11/74* (2013.01)
  *H01G 11/06* (2013.01)
  *H01G 11/24* (2013.01)
  *H01G 11/70* (2013.01)
  *H01G 11/84* (2013.01)
  *H01M 10/04* (2006.01)
  *H01M 10/0525* (2010.01)
  *H01M 10/058* (2010.01)

(52) U.S. Cl.
  CPC ............... *H01G 11/74* (2013.01); *H01G 11/84* (2013.01); *H01M 2/263* (2013.01); *H01M 10/0431* (2013.01); *H01M 10/058* (2013.01); *H01M 10/0525* (2013.01); *Y02E 60/12* (2013.01); *Y02E 60/13* (2013.01); *Y10T 29/49117* (2015.01)

(56) References Cited

U.S. PATENT DOCUMENTS

| 2007/0009793 A1* | 1/2007 | Kim et al. .................. 429/175 |
| 2010/0203371 A1 | 8/2010 | Nagai et al. |
| 2010/0233526 A1 | 9/2010 | Tasai et al. |
| 2011/0223454 A1 | 9/2011 | Urano et al. |
| 2012/0021267 A1 | 1/2012 | Tasai et al. |

FOREIGN PATENT DOCUMENTS

| JP | 2003-249423 A | | 9/2003 | |
| JP | 2003-346770 A | | 12/2003 | |
| JP | 2003-346774 A | | 12/2003 | |
| JP | 2005-216825 A | | 8/2005 | |
| JP | 2006-228551 | * | 8/2006 | ............. H01M 2/26 |
| JP | 2006-228551 A | | 8/2006 | |
| JP | 2006-236790 A | | 9/2006 | |
| JP | 2007-019017 A | | 1/2007 | |
| JP | 2009-026705 A | | 2/2009 | |
| JP | 2011-014276 | * | 1/2011 | ............. H01M 2/30 |
| JP | 2011-014276 A | | 1/2011 | |
| JP | 2011-192517 A | | 9/2011 | |

OTHER PUBLICATIONS

U.S. Office Action dated Oct. 15, 2013 in co-pending U.S. Appl. No. 13/515,849.
International Search Report in PCT/JP2011/067103 dated Nov. 1, 2011 (English translation thereof).

* cited by examiner

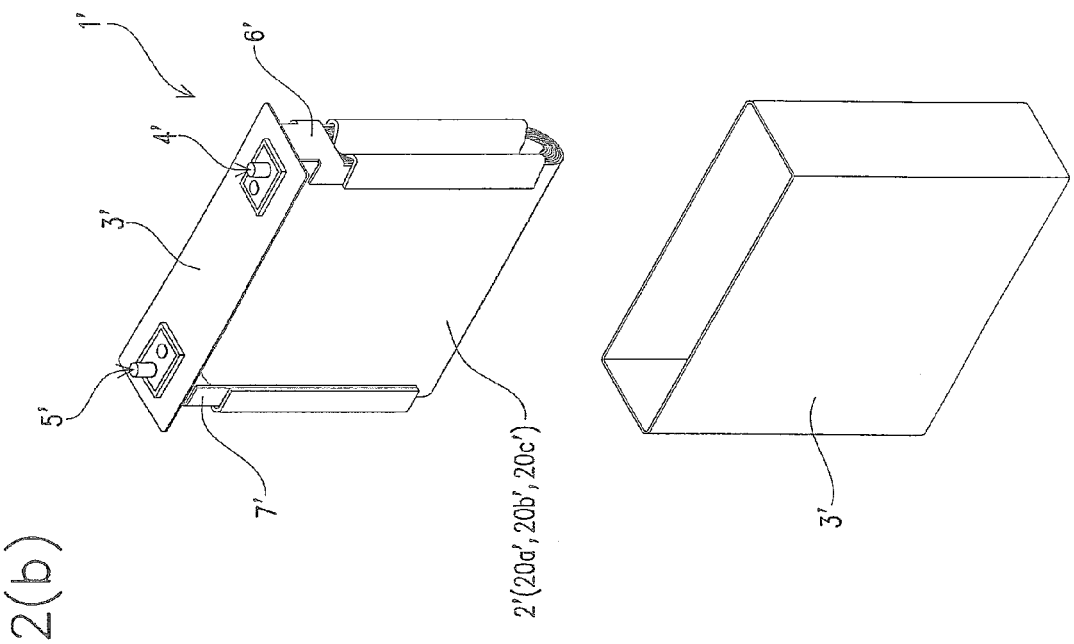
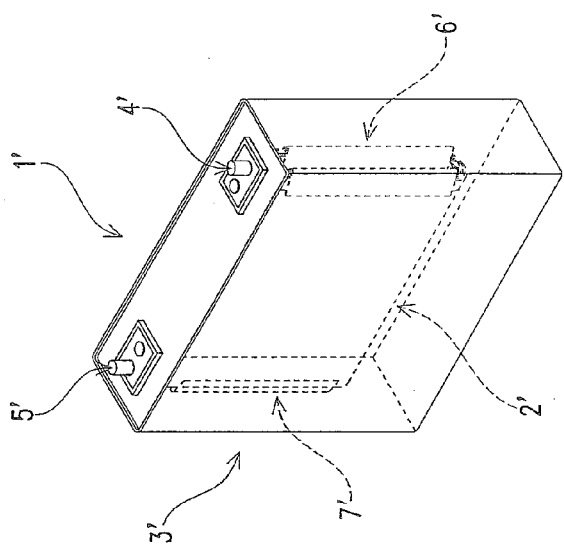

ELECTRIC STORAGE DEVICE PROVIDED WITH CURRENT COLLECTING MEMBER, AND METHOD FOR MANUFACTURING CURRENT COLLECTING MEMBER

The present application is a Divisional application of U.S. patent application Ser. No. 13/515,849, filed on Jun. 14, 2012, which is based on International Application No. PCT/JP2011/067103, filed on Jul. 27, 2011, which is based on and claims priority from Japanese patent application No. 2010-184043, filed on Aug. 19, 2010, and Japanese patent application No. 2010-222660, filed on Sep. 30, 2010, the entire contents of which are incorporated herein by reference.

FIELD OF THE INVENTION

The present invention relates to an electric storage device provided with a current collecting member. More particularly, the present invention relates to a current collecting member for connecting an electrode assembly and an external terminal to each other in the electric storage device. The present invention also relates to a method for manufacturing the current collecting member.

RELATED ART

In recent years, a rechargeable and dischargeable electric storage device has been employed as a power source of various types of equipment. Note that in the present specification, "electric storage device" is a conceptual wording that encompasses both cells (lithium-ion battery cell, nickel-metal hydride battery cell, and the like) and capacitors (electric double layer capacitor, and the like).

As illustrated in FIGS. 12($a$), 12($b$) and 13, a cell is generally configured by electrically connecting a power generating element 2' housed in a cell case 3' and an external terminal 4' provided for external connection through a current collecting member 6', and electrically connecting the power generating element 2' and an external terminal 5' through a current collecting member 7', thereby enabling an electric current to be turned on between the power generating element 2' and a pair of the external terminals 4' and 5'.

More specifically, a cell 1' is provided with a cell case 3', a power generating element 2' in which a positive electrode plate 20$a$' and a negative electrode plate 20$b$' holding a separator 20$c$' therebetween are flatly wound and housed in the cell case 3', a pair of external terminals 4' and 5' provided for external connection, a pair of current collecting members 6' and 7' arranged along an inner surface of the cell case 3' to connect the power generating element 2' with each of the pair of external terminals 4' and 5', and a pair of clip members 8' and 9' for coupling each of the laminated portions (positive-electrode laminated portion 21$a$' and negative-electrode laminated portion 21$b$') of the positive electrode plate 20$a$' and the negative electrode plate 20$b$' of the power generating element 2' with each of the pair of current collecting members 6' and 7'.

One current collecting member 6' is provided with an external terminal connecting portion 600' electrically connected to the external terminal 4', and a pair of power generating element connecting portions 601' and 601' extending out of one end of the external terminal connecting portion 600' and connected to a positive-electrode laminated portion 21$a$' of the positive electrode plate 20$a$' of the power generating element 2'. The one current collecting member 6' is an integrally-molded member including the external terminal connecting portion 600' and the pair of power generating element connecting portions 601' and 601' by processing a metal plate. The other current collecting member 7' has the same configuration as that of the one current collecting member 6'. The one current collecting member 6' is connected to the one external terminal 4' at the external terminal connecting portion 600' of the current collecting member 6'. The other current collecting member 7' is connected to the other external terminal 5' at the external terminal connecting portion 700' of the current collecting member 7'.

In such a cell 1' as described above, each of the pair of power generating element connecting portions 601' and 601' of the one current collecting member 6', while being fitted along an outer surface of the positive-electrode laminated portion 21$a$' of the power generating element 2', is connected to the positive-electrode laminated portion 21$a$' through the clip member 8'. Likewise, each of the pair of power generating element connecting portions 701' and 701' of the other current collecting member 7', while being fitted along an outer surface of the negative-electrode laminated portion 21$b$' of the power generating element 2', is connected to the negative-electrode laminated portion 21$b$' through the clip member 9'. Consequently, in the cell 1' described above, it is possible to take out the generated power of the power generating element 2' from the external terminals 4' and 5' through the current collecting members 6' and 7' (see, for example, Patent Document 1).

Incidentally, in such a cell 1' as described above, the positive-electrode laminated portion 21$a$' and the power generating element connecting portion 601' are clamped with the clip member 8', a horn (not illustrated) fitted on an oscillator is inserted into an inner portion (hereinafter referred to as "winding center") 22$a$' of the power generating element 2' close to the positive electrode plate 20$a$', an anvil (not illustrated) is arranged outside the power generating element 2', the positive-electrode laminated portion 21$a$' and the power generating element connecting portion 601' are sandwiched by the horn and the anvil, and ultrasonic waves are applied to the horn (ultrasonic welding), thereby connecting together the power generating element 2' and the power generating element connecting portion 601' (current collecting member 6'), as illustrated in FIG. 12. The other current collecting member 7' is the same in this regard as the one current collecting member 6'.

Here, the positive electrode plate 20$a$', the negative electrode plate 20$b$' and the clip members 8' and 9' are formed of a thin metal foil and are, therefore, excellent in energy transfer efficiency. Consequently, ultrasonic waves oscillated from the horn inserted in the inner portion (winding center 22$a$' or winding center 22$b$') of the power generating element 2' are transferred from the clip member 8' to the positive electrode plate 20$a$' and from the clip member 9' to the negative electrode plate 20$b$', thus fusing the positive electrode plate 20$a$', the negative electrode plate 20$b$' and the clip members 8' and 9' from inside the power generating element 2'. Accordingly, it is possible to efficiently weld the positive electrode plate 20$a$' and the clip member 8' to each other, and the negative electrode plate 20$b$' and the clip member 9' to each other.

CITATION LIST

Patent Document

Patent Document 1: Japanese Patent Application Laid-Open No. 2003-346770

DISCLOSURE OF THE INVENTION

Problems to be Solved by the Invention

However, the power generating element 2' is configured such that the positive electrode plate 20a' and the negative electrode plate 20b' holding the separator 20c' therebetween are wound flatly and closely, and therefore, the inner portions (winding centers 22a' and 22b') of the power generating element 2' are narrow. Thus, horns which can be inserted into the winding centers 22a' and 22b' are limited in size and shape. Accordingly, it is difficult to insert horns into the winding centers 22a' and 22b' at a correct angle. Consequently, the strength of weld between the power generating element 2' and the current collecting member 6' (power generating element connecting portion 601') and between the power generating element 2' and the current collecting member 7' (power generating element connecting portion 701') is liable to instability. Accordingly, there is a demand for a current collecting member capable of increasing the strength of connection with a power generating element. This is also true for a current collecting member in a capacitor (electric double layer capacitor, or the like).

Hence, in view of the above-described circumstances, it is an object of the present invention to provide an electric storage device provided with a current collecting member capable of increasing the strength of connection with an electrode assembly. It is another object of the present invention to provide a method for manufacturing such a current collecting member.

Means for Solving Problems

According to the present invention, there is provided an electric storage device, which includes:
a case;
an electrode assembly housed in the case and including a positive electrode plate and a negative electrode plate which are wound together while being isolated from each other;
an external terminal arranged outside the case; and
a current collecting member arranged inside the case to electrically connect the electrode assembly with the external terminal,
wherein the current collecting member includes:
a first portion including a first end portion and a second end portion and electrically connected to the external terminal; and
a second portion extending out of the second end portion of the first portion and electrically connected to the electrode assembly, and
and the second portion includes:
a base portion including a first end portion and a second end portion, the first end portion being connected to the second end portion of the first portion;
a twisted portion including a first end portion and a second end portion, the first end portion being connected to the second end portion of the base portion; and
an insertion portion including a first end portion and a second end portion, the first end portion being connected to the second end portion of the twisted portion, the insertion portion being inserted into a winding center of the electrode assembly and electrically connected to the electrode assembly.

Here, the electric storage device according to the present invention may have a configuration in which:
the second portion further includes:
a reverse-twisted portion twisted in a direction opposite to the twisting direction of the twisted portion and including a first end portion and a second end portion, the first end portion being connected to the second end portion of the insertion portion; and
a leading end portion including a first end portion, the first end portion being connected to the second end portion of the reverse-twisted portion.

In addition, the electric storage device according to the present invention may have a configuration in which:
a pair of combinations each including the twisted portion, the insertion portion and the reverse-twisted portion is provided at intervals in parallel to one another, and
the leading end portion couples the second end portions of the pair of reverse-twisted portion with each other.

Yet additionally, the electric storage device according to the present invention may have a configuration in which:
a pair of combinations each including the twisted portion and the insertion portion is provided at intervals in parallel to each other.

Still additionally, the electric storage device according to the present invention may have a configuration in which:
the twisted portion is twisted at an angle of 90 or approximately 90 degrees, so that the base portion and the insertion portion are orthogonal or nearly orthogonal to each other.

Still additionally, the electric storage device according to the present invention may have a configuration in which:
the twisted portion is twisted at an angle of 90 or approximately 90 degrees, so that the base portion and the insertion portion are orthogonal or nearly orthogonal to each other, and
the reverse-twisted portion is twisted at an angle of 90 or approximately 90 degrees in a direction opposite to the twisting direction of the twisted portion, so that the insertion portion and the leading end portion are orthogonal or nearly orthogonal to each other and that the base portion and the leading end portion are flush or nearly flush with each other.

Still additionally, the electric storage device according to the present invention may have a configuration in which:
the current collecting member is arranged so that the base portion faces an end face of the electrode assembly.

Still additionally, the electric storage device according to the present invention may have a configuration in which:
the current collecting member is arranged so that the base portion and the leading end portion face an end face of the electrode assembly.

Still additionally, the electric storage device according to the present invention may have a configuration in which:
each of the pair of insertion portions is provided with, on the leading end side of the insertion portion in the insertion direction thereof, an inclined surface inclined so as to approach a counterpart insertion portion.

In addition, according to the present invention, there is provided an electric storage device, which includes:
a case;
an electrode assembly in which a positive electrode plate and a negative electrode plate are flatly wound, while being isolated from each other, and housed in the case;
a pair of external terminals provided for external connection; and
a pair of current collecting members arranged along an inner surface of the case to electrically connect the electrode assembly and each of the pair of external terminals,
wherein at least one of the pair of current collecting members includes an external terminal connecting portion arranged along an inner surface of the case, and an electrode assembly connecting portion extending out of an end portion of the external terminal connecting portion and connected to a laminated portion of the positive electrode plate or a laminated portion of the negative electrode plate of the electrode assembly, and is a current collecting member in which the external terminal connecting portion and the electrode assembly connecting portion are integrally molded by processing a metal plate, a central portion of the electrode assembly connecting portion in the width direction thereof orthogonal to the extending direction thereof is divided, thereby forming in the electrode assembly connecting portion a pair of divided portions, each of the pair of divided portions includes:

a twisted portion twisted in the width direction of the electrode assembly connecting portion; and an insertion portion provided in continuity with the twisted portion, the insertion portion is formed so that surfaces of the insertion portions face each other, and is inserted into a winding center of the positive electrode plate or the negative electrode plate of the electrode assembly, and the insertion portion is electrically connected to the laminated portion of the positive electrode plate or the laminated portion of the negative electrode plate of the electrode assembly.

In addition, according to the present invention, there is provided a method for manufacturing a current collecting member, which includes the steps of:

providing a metal plate having a length in a first direction orthogonal to a second direction longer than a length in the second direction;

forming a score along the first direction in the metal plate, excluding at least both end portions thereof in the first direction, thereby forming a pair of divided portions lining up in the second direction; and twisting each of the divided portions in the second direction, so that the rest of each of the divided portions excluding both end portions in the first direction intersects with a surface of the metal plate in each of the divided portions.

Advantages of the Invention

As described above, according to the electric storage device in accordance with the present invention, it is possible to increase the connection strength of the electrode assembly and the current collecting member.

BRIEF DESCRIPTION OF THE DRAWINGS

FIGS. 4(a)-4(c) are explanatory views of a power generating element according to the embodiment, wherein FIG. 4(a) is a partial plan view used to describe respective regions formed on a positive electrode plate composing the power generating element, FIG. 4(b) is a partial plan view used to describe respective regions formed on a negative electrode plate composing the power generating element, and FIG. 4(c) is an explanatory drawing used to describe the configurational relationship between the respective regions on the positive electrode plate and the respective regions on the negative electrode plate under the condition that the positive electrode plate illustrated in FIG. 4(a) and the negative electrode plate illustrated in FIG. 4(b) together hold a separator therebetween.

FIGS. 6(a) and 6(b) illustrate modified examples of the current collecting member according to the embodiment, wherein FIG. 6(a) is a figure illustrating that one of a pair of divided portions of the current collecting member is twisted from the central portion side of a power generating element connecting portion in the width direction thereof toward the end portion side of the power generating element connecting portion in the width direction thereof, and the other divided portion is twisted from the end portion side of the power generating element connecting portion in the width direction thereof toward the central portion side of the power generating element connecting portion in the width direction thereof, and FIG. 6(b) is a figure illustrating that both of the pair of divided portions are twisted from the end portion side of the current collecting member in the width direction thereof toward the central portion side of the power generating element connecting portion in the width direction thereof.

FIGS. 9(a) and 9(b) illustrate a modified example of the current collecting member illustrated in FIG. 5, wherein FIG. 9(a) is a perspective view of the current collecting member and FIG. 9(b) is a partially enlarged view of an electrode assembly connecting portion taken from below the electrode assembly connecting portion.

FIGS. 10(a) and 10(b) illustrate a current collecting member according to yet another embodiment of the present invention, wherein FIG. 10(a) illustrates a modified example of the current collecting member illustrated in FIG. 6(a), and FIG. 10(b) illustrates a modified example of the current collecting member illustrated in FIG. 6(b).

FIGS. 12(a) and 12(b) illustrate a conventional cell, wherein FIG. 12(a) is an overall perspective view and FIG. 12(b) is a partially exploded perspective view.

DETAILED DESCRIPTION OF THE PREFERRED EMBODIMENT

Hereinafter, a cell which is one embodiment of an electric storage device according to the present invention will be described with reference to the accompanying drawings.

Figure 1:
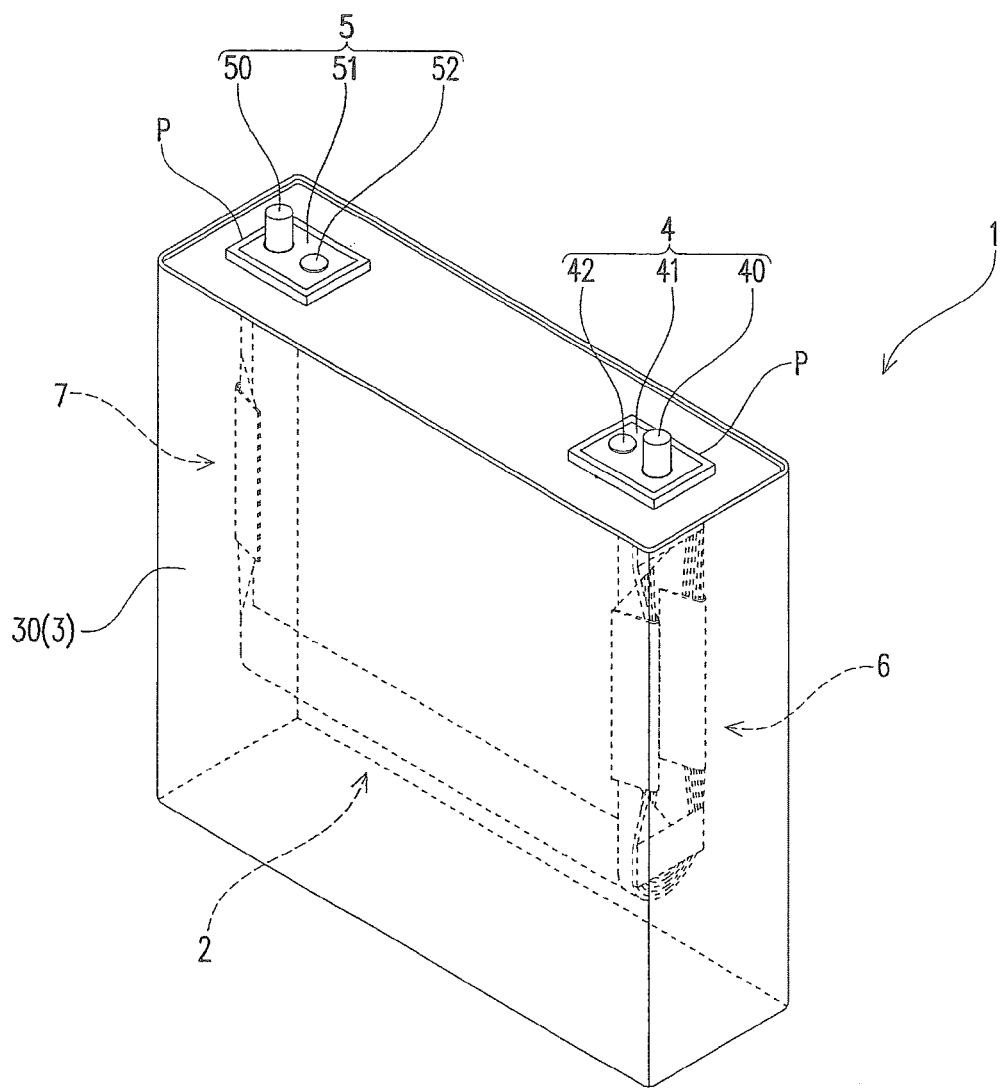
FIG. 1 is an overall perspective view of a cell according to one embodiment of the present invention.
Figure 3:
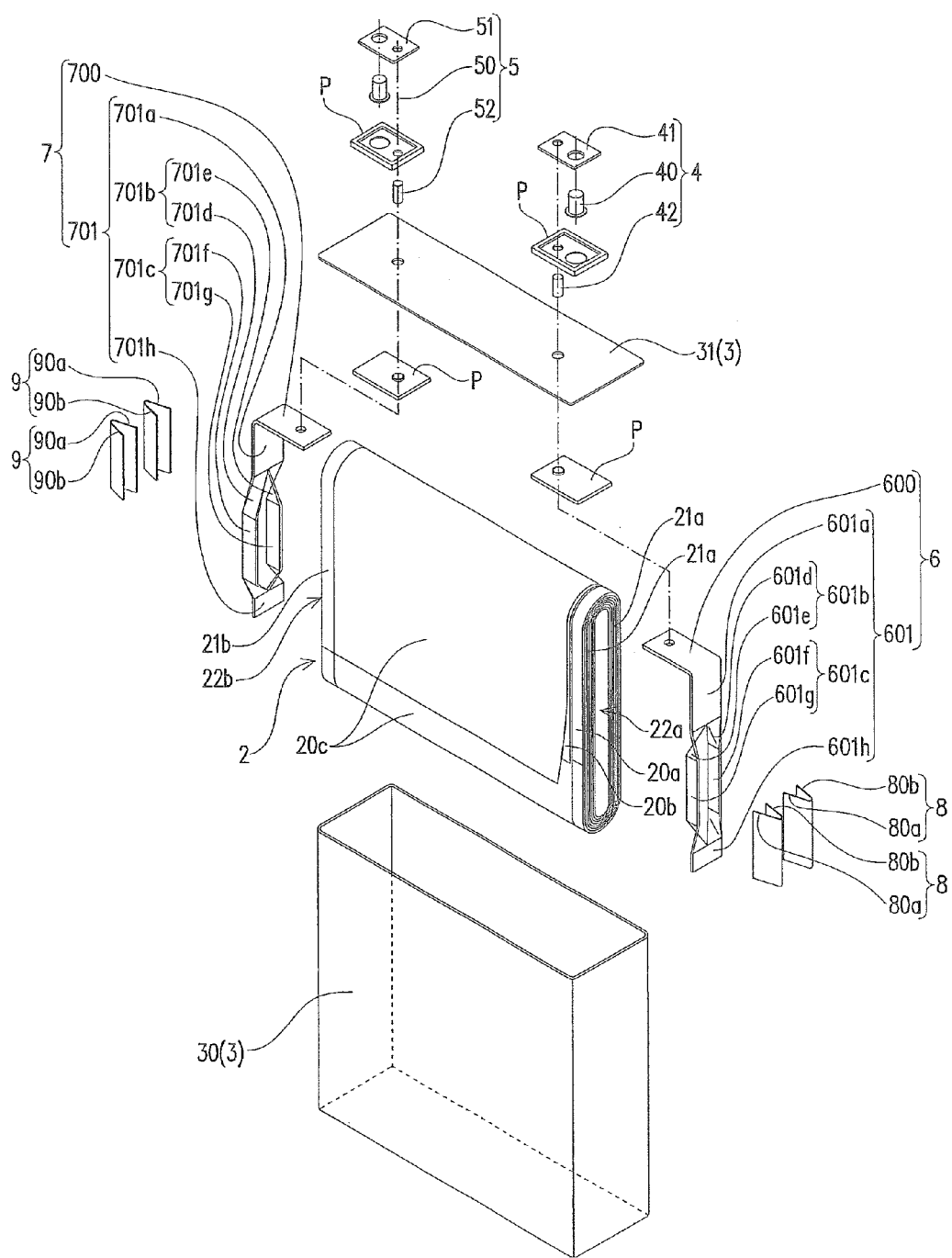
FIG. 3 is an exploded perspective view of the cell according to the embodiment.

As illustrated in FIGS. 1 and 3, a cell 1 according to the present embodiment includes a cell case (case) 3, a power generating element 2 serving as an electrode assembly in which a positive electrode plate 20a and a negative electrode plate 20b holding a separator 20c therebetween are flatly wound and housed in the cell case 3, a pair of external terminals 4 and 5 (hereinafter referred to as the positive-electrode external terminal 4 and the negative-electrode external terminal 5) provided for external connection, a pair of current collecting members 6 and 7 (hereinafter referred to as the positive-electrode current collecting member 6 and the negative-electrode current collecting member 7) arranged along an inner surface of the cell case 3 to connect the power generating element 2 with each of the pair of external terminals 4 and 5, and a pair of clip members 8 and 9 for coupling each of the laminated portions 21a and 21b (hereinafter referred to as the positive-electrode laminated portion 21a and the negative-electrode laminated portion 21b) of the positive electrode plate 20a and the negative electrode plate 20b of the power generating element 2 with each of the pair of current collecting members 6 and 7.

As illustrated in FIG. 3, the power generating element 2 is formed by the positive electrode plate 20a and the negative electrode plate 20b flatly wound with the separator 20c held therebetween. That is, the positive electrode plate 20a, the negative electrode plate 20b and the separator 20c are all formed into a band shape and stacked to each other in the order of the positive electrode plate 20a, the separator 20c and the negative electrode plate 20b, while being aligned with one another in a longitudinal direction, thus being wound spirally.

The length of the separator 20c in the longitudinal direction thereof is set longer than those of the positive electrode plate 20a and the negative electrode plate 20b. Accordingly, a terminal portion of the separator 20c envelops the outermost positive electrode plate 20a or negative electrode plate 20b (positive electrode plate 20a in the present embodiment). That is, the positive electrode plate 20a, the separator 20c and the negative electrode plate 20b, excluding the outermost circumference of the power generating element 2, are stacked on each other in keeping with the order thereof. However, the separator 20c extending out of the terminal portions (end portions on the opposite side of leading end portions which are volute tongues) of the positive electrode plate 20a and the negative electrode plate 20b is wound larger in the number of turns than the positive electrode plate 20a and the negative electrode plate 20b, and therefore, arranged on the outermost circumference of the power generating element 2.

Figure 4A:
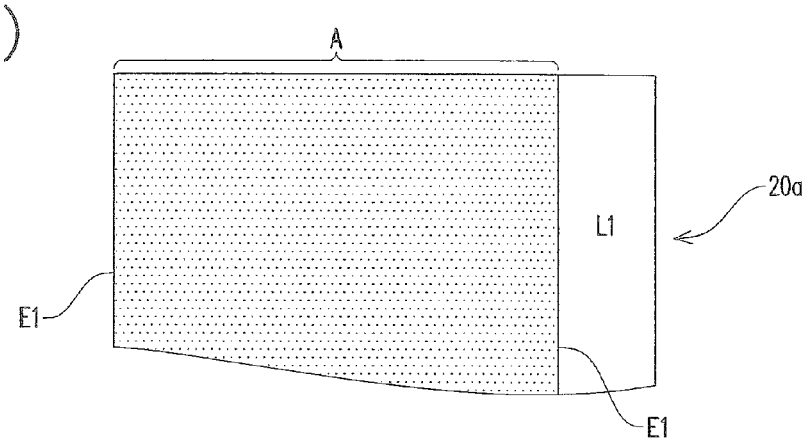

The positive electrode plate 20a is formed by coating a positive-electrode active material on a metal foil. As illustrated in FIG. 4(a), a positive-electrode lead portion L1 composed of a positive-electrode active material uncoated region (metal foil) is formed in one end portion of the positive electrode plate 20a in the width direction thereof, and a positive-electrode active material coated region (hereinafter referred to as the positive-electrode coated region) A is formed in the positive electrode plate 20a, excluding the one end portion thereof, so as to adjoin the positive-electrode lead portion L1.

Figure 4B:
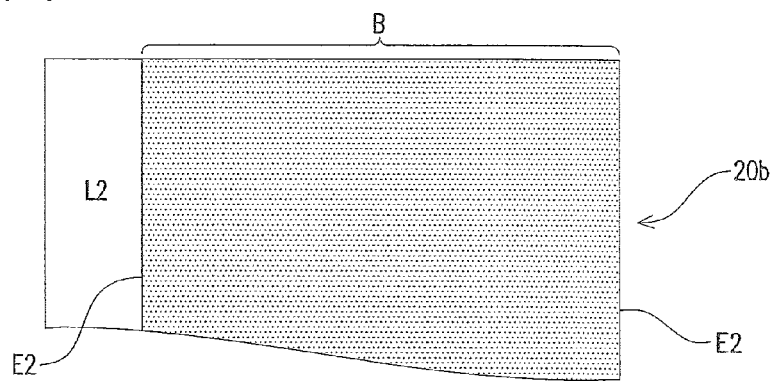
Figure 4C:
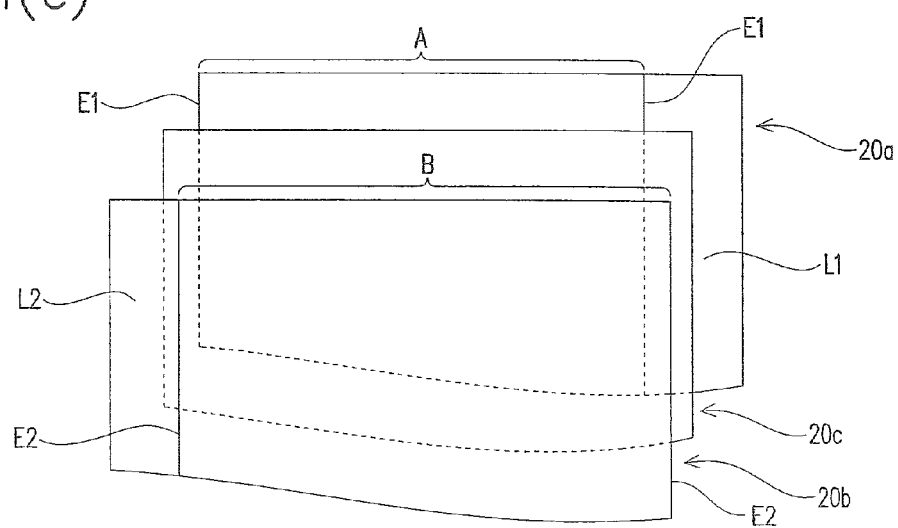

The negative electrode plate 20b is formed by coating a negative-electrode active material on a metal foil. As illustrated in FIG. 4(b), a negative-electrode lead portion L2 composed of a negative-electrode active material uncoated region is formed in the other end portion of the negative electrode plate 20b in the width direction thereof, and a negative-electrode active material coated region (hereinafter referred to as the negative-electrode coated region) B is formed in the negative electrode plate 20b, excluding the other end portion thereof, so as to adjoin the negative-electrode lead portion L2. In addition, as illustrated in FIG. 4(c), the positive-electrode coated region A is formed, with the positive electrode plate 20a and the negative electrode plate 20b holding the separator 20c therebetween, so that both edges E1 and E1 of the positive-electrode coated region A in the width direction thereof overlap with the negative-electrode coated region B. That is, the negative-electrode coated region B is formed so as to protrude outward from both edges E1 and E1 of the positive-electrode coated region A in the width direction thereof.

In addition, the positive electrode plate 20a and the negative electrode plate 20b are stacked on each other, while being displaced form each other in the width direction, so that one end portion (positive-electrode lead portion L1) of the positive electrode plate 20a and the other end portion (negative-electrode lead portion L2) of the negative electrode plate 20b do not overlap with a counterpart electrode plate (the negative electrode plate 20b for the positive electrode plate 20a and the positive electrode plate 20a for the negative electrode plate 20b), and wound spirally.

Consequently, the power generating element 2 is provided with a laminated part of only the positive electrode plate 20a (positive-electrode lead portion L1) in one end portion in the width direction, whereas the power generating element 2 is provided with a laminated part of only the negative electrode plate 20b (negative-electrode lead portion L2) in the other end portion in the width direction. In addition, the positive-electrode external terminal 4 is electrically connected to the laminated part of only the positive electrode plate 20a (positive-electrode lead portion L1), and the negative-electrode external terminal 5 is electrically connected to the laminated part of only the negative electrode plate 20b (negative-electrode lead portion L2).

As the result of the positive-electrode coated region A being formed so that both edges E1 and E1 of the positive-electrode coated region A in the width direction thereof overlap with the negative-electrode coated region B, as described above, electrocrystallization is prevented from occurring in the vicinity of edges E2 and E2 of the negative-electrode coated region B in the width direction thereof.

Since the power generating element 2 is flatly formed as described above, the laminated part of the positive-electrode lead portion L1 takes the form of a flat annular shape when viewed from the winding center direction of the power generating element 2. The laminated part of the negative-electrode lead portion L2 also takes the form of a flat annular shape when viewed from the winding center direction. In addition, the power generating element 2 is housed in the cell case 3 with the long axis direction (cross-sectional long axis direction) of the power generating element 2 as viewed from the winding center direction facing up and down.

As illustrated in FIG. 3, the cell case 3 is provided with a case body 30 having a rectangular box shape one surface of which is open, and a cover plate 31 for sealing the open portion of the case body 30. In addition to the power generating element 2, the positive-electrode current collecting member 6 and the negative-electrode current collecting member 7 are housed in the cell case 3. In addition, the cell case 3 is filled with an electrolyte solution.

Figure 2:
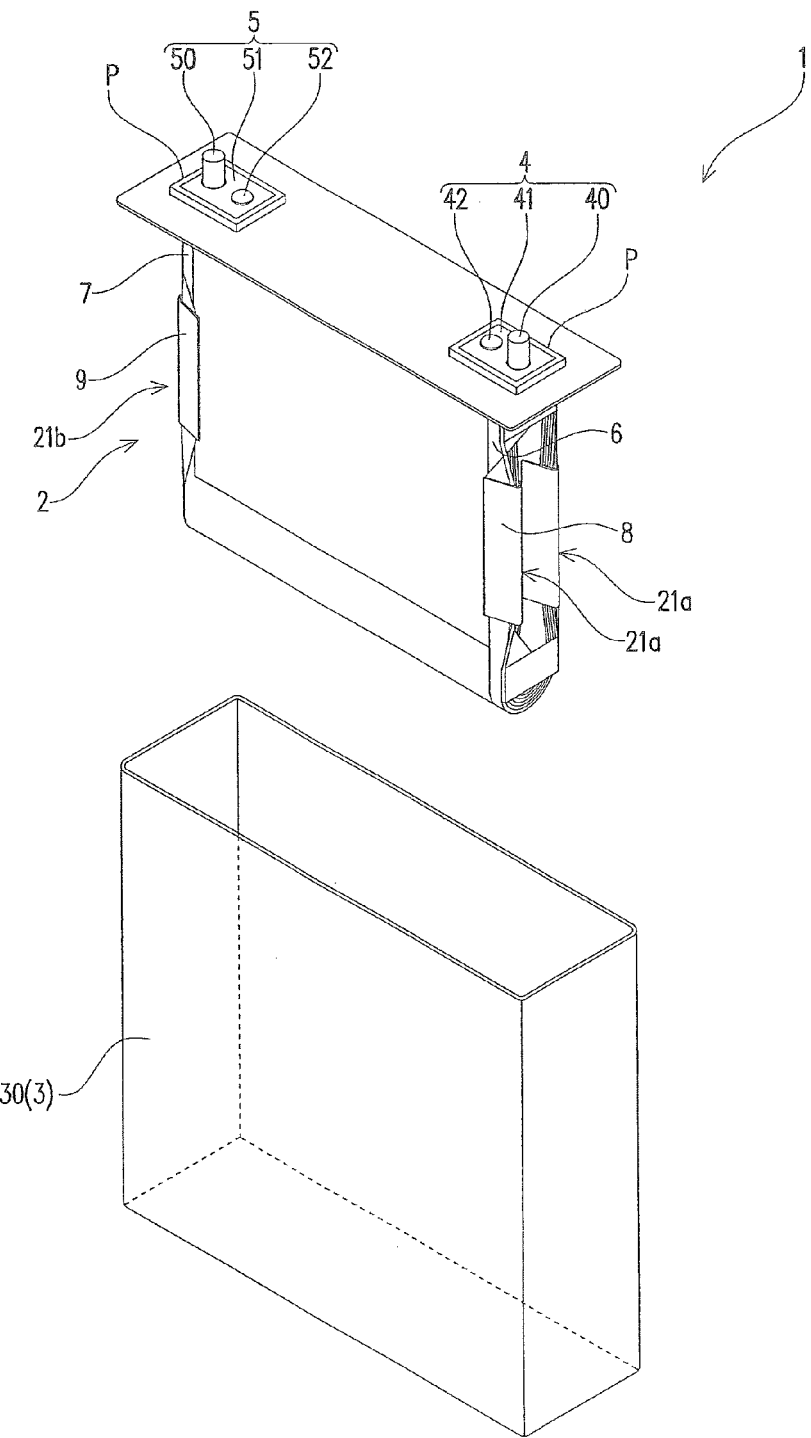
FIG. 2 is a partially exploded perspective view of the cell according to the embodiment.

As illustrated in FIGS. 1 to 3, the positive-electrode external terminal 4 and the negative-electrode external terminal 5 share a common configuration and are disposed outside the cell case 3 (cover plate 31), so as to be symmetrical to each other with respect to the cell case 3 (cover plate 31). In addition, the positive-electrode external terminal 4 is connected to the positive-electrode current collecting member 6, and the negative-electrode external terminal 5 is connected to the negative-electrode current collecting member 7. As illustrated in FIG. 3, the positive-electrode external terminal 4 is provided with a terminal part 40 for electrically connecting and fixing a connection object (not illustrated), such as a cable or a bus bar, a connecting fitting 41 arranged on an outer surface of the cell case 3 (cover plate 31) and made of a reed-shaped metal plate, and connecting means 42 for connecting the positive-electrode current collecting member 6 with the connecting fitting 41. The negative-electrode external terminal 5 has the same configuration as that of the positive-electrode external terminal 4.

The terminal parts 40 and 50 are composed of male-threaded members, and each terminal part is outwardly inserted through one end portion of each of the connecting fittings 41 and 51 in the longitudinal direction thereof. In addition, the other end portion of each of the connecting fittings 41 and 51 in the longitudinal direction thereof is fixed to the cover plate 31 by each of connecting means (for example, rivets inserted through the cover plate 31) 42 and 52.

The positive-electrode current collecting member 6 and the negative-electrode current collecting member 7 are disposed so as to be symmetrical to each other with respect to the cell case 3 (case body 30) inside the cell case 3 (case body 30). Note that the positive-electrode current collecting member 6 and the negative-electrode current collecting member 7 are the same in configuration. Hence, hereinafter, the positive-electrode current collecting member 6 will be described as a representative of the positive-electrode current collecting member 6 and the negative-electrode current collecting member 7.

As illustrated in FIG. 3, the positive-electrode current collecting member 6 is provided with an external terminal connecting portion 600 that is electrically connected to the terminal part 40 arranged outside the cell case 3 and that serves as a first portion, and a power generating element connecting portion 601 that extends out of an end portion of the external terminal connecting portion 600 and is connected to the positive-electrode laminated portion 21a of the positive electrode plate 20a of the power generating element 2 and that serves as a second portion and an electrode assembly connecting portion. The positive-electrode current collecting member 6 is an integrally-molded member composed of the external terminal connecting portion 600 and the power generating element connecting portion 601 by processing a thin metal plate. The metal plate is of a band shape. Accordingly, the length of the metal plate in the longitudinal direction thereof as a first direction is longer than the length of the metal plate in the width direction thereof as a second direction orthogonal to the longitudinal direction.

Figure 5:
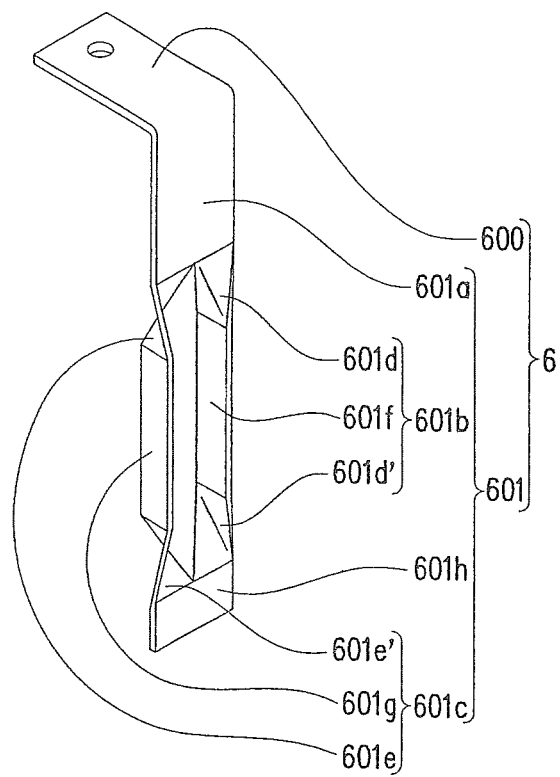
FIG. 5 illustrates a current collecting member according to the embodiment.

As illustrated in FIGS. 3 and 5, a central portion of the power generating element connecting portion 601 in the width direction thereof orthogonal to the extending direction thereof is divided at a halfway position of power generating element connecting portion 601 in the extending direction, thereby forming a pair of divided portions 601b and 601c. Accordingly, the power generating element connecting portion 601 is provided with the pair of divided portions 601b and 601c between the base portion 601a and the leading end portion 601h. One divided portion 601b is provided with a twisted portion 601d twisted in the width direction of the power generating element connecting portion 601, a reverse-twisted portion 601d' likewise twisted in the width direction of the power generating element connecting portion 601 but in a direction opposite to the twisting direction of the twisted portion 601d, and an insertion portion 601f provided in continuity with the twisted portion 601d and the reverse-twisted portion 601d'. The other divided portion 601c is provided with a twisted portion 601e twisted in the width direction of the power generating element connecting portion 601, a reverse-twisted portion 601e' likewise twisted in the width direction of the power generating element connecting portion 601 but in a direction opposite to the twisting direction of the twisted portion 601e, and an insertion portion 601g provided in continuity with the twisted portion 601e and the reverse-twisted portion 601e'. The insertion portions 601f and 601g are formed so that surfaces thereof face each other. In addition, the insertion portions 601f and 601g are formed so as to be insertable into the winding center 22a of the positive electrode plate 20a of the power generating element 2.

Figure 6A:
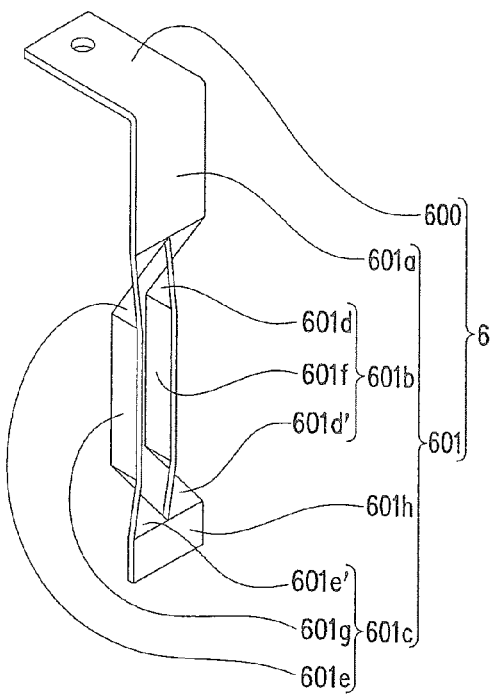
Figure 6B:
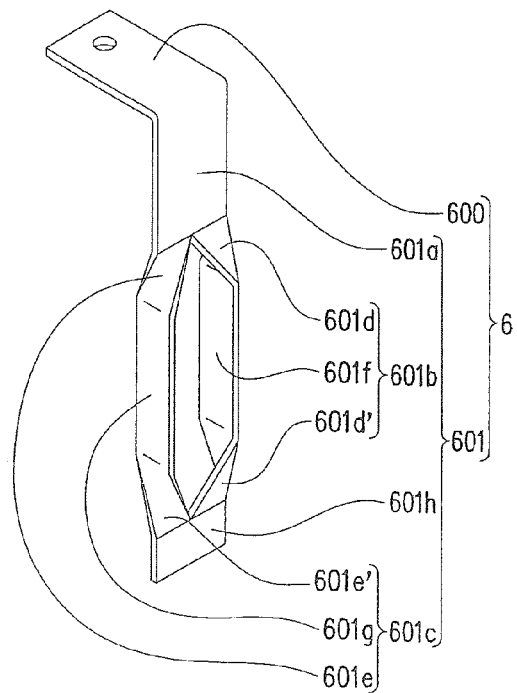

Here, in the present embodiment, each of the pair of divided portions 601b and 601c is twisted from the central portion side of the power generating element connecting portion 601 in the width direction thereof toward the end portion side of the power generating element connecting portion 601 in the width direction thereof. Accordingly, it is possible to more easily insert the insertion portions 601f and 601g of the pair of divided portions 601b and 601c into the winding center 22a of the positive electrode plate 20a and into the winding center 22b of the negative electrode plate 20b of the power generating element 2 than in a configuration in which both of the pair of divided portions 601b and 601c are twisted in the same direction, as illustrated in FIG. 6(a) and in a configuration in which both of the pair of divided portions 601b and 601c are twisted from the end portion side of the power generating element connecting portion 601 in the width direction thereof toward the central portion side of the power generating element connecting portion 601 in the width direction thereof, as illustrated in FIG. 6(b). Consequently, according to the cell 1 in accordance with the present embodiment, it is possible to improve productivity and reliability.

Note that the expression "both of the pair of divided portions 601b and 601c are twisted in the same direction" means that either one of the pair of divided portions 601b and 601c is twisted from the central portion side of the power generating element connecting portion 601 in the width direction thereof toward the end portion side of the power generating element connecting portion 601 in the width direction thereof, and the other one of the pair of divided portions 601b and 601c is twisted from the end portion side of the power generating element connecting portion 601 in the width direction thereof toward the central portion side of the power generating element connecting portion 601 in the width direction thereof. FIG. 6(a) illustrates a configuration in which the divided portion 601b is twisted from the end portion side of the power generating element connecting portion 601 in the width direction thereof toward the central portion side of the power generating element connecting portion 601 in the width direction thereof.

As described above, the positive-electrode current collecting member 6 is provided with the external terminal connecting portion (first portion) 600 connected to the positive-electrode external terminal 4, and the power generating element connecting portion (second portion) 601 extending out of the other end portion of the external terminal connecting portion 600 and connected to the power generating element 2, as illustrated in FIGS. 3 and 5. The power generating element connecting portion 601 is bent with respect to the external terminal connecting portion 600. That is, the external terminal connecting portion 600 and the power generating element connecting portion 601 intersect with each other. In the present embodiment, the connecting portions intersect with each other at an angle of 90 or nearly 90 degrees.

The power generating element connecting portion 601 is provided with a base portion 601a connected to the other end portion of the external terminal connecting portion 600, a pair of twisted portions 601d and 601e connected abreast to the other end portion of the base portion 601a, a pair of insertion portions 601f and 601g respectively connected to the other end portion of each of the pair of twisted portions 601d and 601e, a pair of reverse-twisted portions 601d' and 601e' respectively connected to the other end portion of each of the pair of insertion portions 601f and 601g, and a leading end portion 601h connected to the other end portion of each of the pair of reverse-twisted portions 601d' and 601e'.

Consequently, in the power generating element connecting portion, a combination of the twisted portion 601d, the insertion portion 601f and the reverse-twisted portion 601d' constitutes one divided portion 601b, a combination of the twisted portion 601e, the insertion portion 601g and the reverse-twisted portion 601e' constitutes the other divided portion 601c, one end portions of the pair of divided portions 601b and 601c are coupled with each other by the base portion 601a, and the other end portions of the pair of divided portions 601b and 601c are coupled with each other by the leading end portion 601h.

Since the power generating element connecting portion 601 is formed by processing a metal plate, the base portion 601a, the twisted portions 601d and 601e, the insertion portions 601f and 601g, the reverse-twisted portions 601d' and 601e', and the leading end portion 601h each are of a plate-like shape. In addition, the twisted portions 601d and 601e are twisted at an angle of 90 or nearly 90 degrees. That is, the twisted portions 601d and 601e are twisted so that one end portions and the other end portions thereof intersect with each other at an angle of 90 or nearly 90 degrees. Accordingly, the base portion 601a and the insertion portions 601f and 601g are orthogonal or nearly orthogonal to each other. Each of the reverse-twisted portions 601d' and 601e' is also twisted at an angle of 90 or nearly 90 degrees. That is, one end portions and the other end portions of the reverse-twisted portions 601d' and 601e' are also twisted so as to intersect with each other at an angle of 90 or nearly 90 degrees. Consequently, the insertion portions 601f and 601g and the leading end portion 601h are orthogonal or nearly orthogonal to each other. In addition, the base portion 601a and the leading end portion 601h are flush or nearly flush with each other.

The power generating element connecting portion 601 is arranged along a long axis direction (cross-sectional long axis direction) of the power generating element 2, and disposed so as to face an end face of the power generating element 2. Consequently, the base portion 601a and the leading end portion 601h of the power generating element connecting portion 601 face the end face of the power generating element 2. More specifically, the base portion 601a and the leading end portion 601h face the end face of the power generating element 2 in abutment or nearly in abutment with the end face or at a predetermined interval between each of the base portion 601a and the leading end portion 601h and the end face of the power generating element 2.

Such a positive-electrode current collecting member 6 as described above is fabricated in the following manner. First, a score penetrating through both the front and rear sides of the above-described metal plate is formed therein along the longitudinal direction thereof, excluding at least both end portions of the metal plate in the longitudinal direction thereof. Consequently, a pair of divided portions 601b and 601c aligned in the width direction is formed. Next, each of the pair of divided portions 601b and 601c is twisted in the width direction, so that the rest of the divided portion excluding both end portions thereof in the longitudinal direction intersects with a surface of the metal plate in each of the pair of divided portions 601b and 601c. Here, one end portion (one region in which the metal plate is not divided) of the metal plate in the longitudinal direction thereof serves as the external terminal connecting portion 600 and the base portion 601a. The other end portion (the other region in which the metal plate is not divided) of the metal plate in the longitudinal direction thereof serves as the leading end portion 601h. Both end portions of each of the divided portions 601b and 601c in the longitudinal direction thereof serve as the twisted portions 601d and 601e and the reverse-twisted portions 601d' and 601e'. Portions of the divided portions 601b and 601c excluding both end portions of each thereof in the longitudinal direction serve as the insertion portions 601f and 601g. The positive-electrode current collecting member 6 is fabricated in this manner.

The clip member 8 for the positive-electrode current collecting member 6 is formed by performing double-bending work on a metal plate, and is provided according to places of connection (insertion portions 601f and 601g) with the power generating element 2. The clip member 8 is provided with a pair of opposed pieces 80a and 80b opposed to each other with the bending ridge line of the clip member 8 as a boundary. In addition, the length of the clip member 8 in a direction in which the bending ridge lines of the pair of opposed pieces 80a and 80b extend is set substantially the same as that of the power generating element connecting portion 601. The clip member 9 for the negative-electrode current collecting member 7 has the same configuration as that of the clip member 8 of the positive-electrode current collecting member 6.

Assembling of a cell 1 configured as described above will be described with reference to FIG. 3. First, the external terminal connecting portion 600 of the positive-electrode current collecting member 6 is fixed to the positive-electrode external terminal 4. In the present embodiment, the external terminal connecting portion 600 is fixed to the cover plate 31 by connecting means 42 and electrically connected to the connecting fitting 41 of the positive-electrode external terminal 4. In the present embodiment, a rivet is adopted as the connecting means 42. Hence, by caulking-treating a rivet 42 inserted through the external terminal connecting portion 600 of the positive-electrode current collecting member 6, the cover plate 31, and the connecting fitting 41, the positive-electrode current collecting member 6 and the connecting fitting 41 are fixed to the cover plate 31 and electrically connected to each other. Note that in the present embodiment, the cell case 3 is formed of a conductive metal material. Accordingly, insulating gaskets P, having electrical insulating properties, are arranged between the external terminal connecting portion 600 of the positive-electrode current collecting member 6 and the cover plate 31 and between the connecting fitting 41 and the cover plate 31. The negative-electrode current collecting member 7 is the same in this regard as the positive-electrode current collecting member 6.

The insertion portions 601f and 601g of the positive-electrode current collecting member 6 and the power generating element 2 are ultrasonic-welded to each other. The insertion portions 601f and 601g are inserted into the winding center 22a of the positive electrode plate 20a of the power generating element 2, the insertion portions 601f and 601g and the positive-electrode laminated portion 21a of the power generating element 2 are interposed between the pair of opposed pieces 80a and 80b of the clip member 8, and the two opposed pieces 80a and 80b are caulked so as to approach each other. Under the condition described above, a horn is arranged outside the power generating element 2, an anvil is arranged in the winding center 22a of the positive electrode plate 20a, and ultrasonic waves are applied to the horn. Consequently, the power generating element 2 and the insertion portions 601f and 601g are physically coupled with each other and electrically connected to each other. The negative-electrode current collecting member 7 is the same in this regard as the positive-electrode current collecting member 6.

The power generating element 2 connected to the positive-electrode current collecting member 6 and the negative-electrode current collecting member 7 is then housed inside the cell case 3 with the long axis direction of the power generating element 2 as viewed from the winding center direction thereof facing up and down.

As described above, according to the cell 1 in accordance with the present embodiment, the twisted portion 601d and the reverse-twisted portion 601d' are formed in both end portions of the insertion portion 601f in the extending direction of the power generating element connecting portion 601, and the twisted portion 601e and the reverse-twisted portion 601e' are formed in both end portions of the insertion portion 601g in the extending direction of the power generating element connecting portion 601 in the positive-electrode current collecting member 6. Accordingly, the insertion portions 601f and 601g are easy to be inserted into the winding center 22a of the positive electrode plate 20a. In addition, the twisted portion 601d and the reverse-twisted portion 601d' are formed in both end portions of the insertion portion 601f, and the twisted portion 601e and the reverse-twisted portion 601e' are formed in both end portions of the insertion portion 601g. Consequently, any corners and end faces (angular portions) are not present in two end portions each of the insertion portions 601f and 601g. Accordingly, when the insertion portions 601f and 601g are inserted into the winding center 22a of the positive electrode plate 20a of the power generating element 2, it is possible to suitably prevent such corners or end faces (angular portions) from scraping against an inner surface of the positive-electrode laminated portion 21a and causing damage to the inner surface. The negative-electrode current collecting member 7 is the same in this regard as the positive-electrode current collecting member 6.

In addition, according to the cell 1 in accordance with the present embodiment, it is possible to arrange the horn outside the power generating element 2, arrange the anvil in the winding center 22a of the power generating element 2, and ultrasonic-weld the power generating element 2 and the insertion portions 601f and 601g under the condition of the insertion portions 601f and 601g of the positive-electrode current collecting member 6 being inserted into the winding center 22a of the positive electrode plate 20a of the power generating element 2. Consequently, it is possible to increase the connection strength of the insertion portions 601f and 601g (positive-electrode current collecting member 6) and the power generating element 2. In addition, any portions (constrictions) narrower than the external terminal connecting portion 600 are not formed in a joint of the external terminal connecting portion 600 and the power generating element connecting portion 601. Consequently, the positive-electrode current collecting member 6 is free of cross sectional change throughout a path from the external terminal connecting portion 600 to the power generating element connecting portion 601, and therefore, does not vary in resistance. The negative-electrode current collecting member 7 is the same in this regard as the positive-electrode current collecting member 6.

Yet additionally, according to the cell 1 in accordance with the present embodiment, the positive-electrode current collecting member 6 is arranged so that the base portion 601a faces an end face (an end face of the power generating element 2 taking the form of a flat annular shape when viewed from the direction of the winding center 22a) of the power generating element 2 (positive-electrode laminated portion 21a). Accordingly, as the result of the base portion 601a abutting on the end face of the power generating element 2, it is possible to prevent the insertion portions 601f and 601g from getting too deep into the winding center 22a of the power generating element 2. Thus, it is possible to prevent the insertion portions 601f and 601g from getting too deep into the winding center 22a of the power generating element 2 and causing damage to the positive-electrode laminated portion 21a when the cell 1 is fabricated. In addition, even if any external stress, such as vibration or impact, occurs in the cell 1 with the cell 1 placed in a usage environment, it is possible to prevent the insertion portions 601f and 601g from getting too deep into the winding center 22a of the power generating element 2 and causing damage to the positive-electrode laminated portion 21a. The negative-electrode current collecting member 7 is the same in this regard as the positive-electrode current collecting member 6.

Still additionally, according to the cell 1 in accordance with the present embodiment, the positive-electrode current collecting member 6 is arranged so that also the leading end portion 601h faces an end face (an end face of the power generating element 2 taking the form of a flat annular shape when viewed from the direction of the winding center 22a) of the power generating element 2 (positive-electrode laminated portion 21a). Accordingly, the above-described advantageous effect is made more prominent by this leading end portion 601h.

Still additionally, according to the cell 1 in accordance with the present embodiment, one end portions of the pair of divided portions 601b and 601c are coupled with each other by the base portion 601a, and the other end portions thereof are coupled with each other by the leading end portion 601h. That is, in the positive-electrode current collecting member 6, the pair of divided portions 601b and 601c has a fixed-end structure. Accordingly, even if any external stress, such as vibration or impact, occurs in the cell 1 (in particular, even if vibration or the like occurs in the width direction of the positive-electrode current collecting member 6) with the cell 1 placed in a usage environment, a bifurcation of divided portions 601b and 601c does not become damaged. In the positive-electrode current collecting member 6' of the cell 1' described in the foregoing Background Art paragraph, however, the pair of divided portions 601b' and 601c' has a free-end structure. Accordingly, each of the divided portions 601b' and 601c' freely vibrates. Consequently, a bifurcation of the divided portions 601b' and 601c' may become damaged, and therefore, the positive-electrode current collecting member 6' may break. In the present embodiment, however, such a problem is unlikely to occur. The negative-electrode current collecting member 7 is the same in this regard as the positive-electrode current collecting member 6.

Still additionally, according to the cell 1 in accordance with the present embodiment, the twisted portion 601d and the reverse-twisted portion 601d' are formed in both end portions of the insertion portion 601f inserted into the winding center 22a of the power generating element 2, and the twisted portion 601e and the reverse-twisted portion 601e' are formed in both end portions of the insertion portion 601g. These twisted portions 601d and 601e and reverse-twisted portions 601d' and 601e' constitute extension portions extending out of both end portions of the insertion portions 601f and 601g, in such a manner as to set back from outer surfaces (surfaces of contact with an inner surface of the winding center 22a of the power generating element 2) of the insertion portions 601f and 601g. Accordingly, it is possible to suitably prevent damage on an inner surface of the positive-electrode laminated portion 21a, which damage being caused by the strong contact of both end portions of the insertion portions 601f and 601g to the inner surface of the positive-electrode laminated portion 21a. That is, the insertion portion 601f including the twisted portion 601d and the reverse-twisted portion 601d' in both end portions thereof and the insertion portion 601g including the twisted portion 601e and the reverse-twisted portion 601e' in both end portions thereof smoothly come into contact the positive-electrode laminated portion 21a, without applying stress to an inner surface thereof. Thus, the insertion portions 601f and 601g do not cause any damage to the inner surface of the positive-electrode laminated portion 21a. The negative-electrode current collecting member 7 is the same in this regard as the positive-electrode current collecting member 6.

Note that the present invention is not limited to the above-described embodiment, and it is needless to say that the embodiment can be modified as appropriate, without departing from the gist of the invention.

For example, the electric storage device is not limited to a cell. Alternatively, the electric storage device may be a capacitor, such as an electric double layer capacitor.

Figure 7:
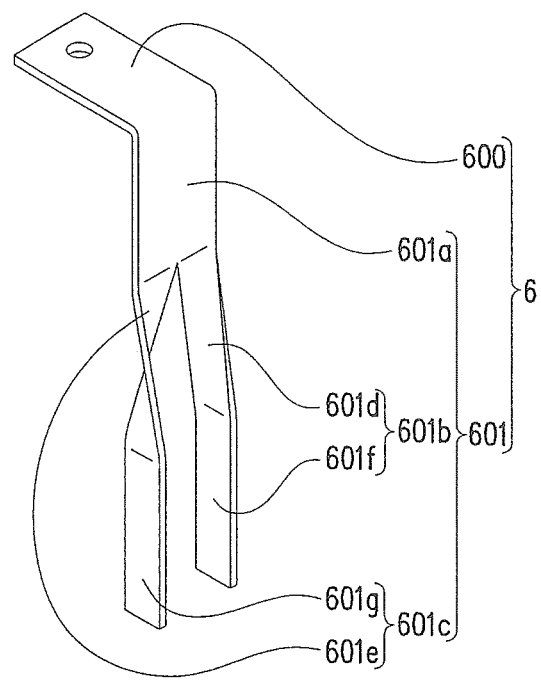
FIG. 7 illustrates a current collecting member according to another embodiment of the present invention.

In addition, the power generating element connecting portion (second portion) 601 of the positive-electrode current collecting member 6 is not limited to the above-described embodiment. For example, as illustrated in FIG. 7, the power generating element connecting portion 601 of the positive-electrode current collecting member 6 may be provided with a pair of divided portions 601b and 601c formed by dividing (decoupling) a central portion of the power generating element connecting portion 601 in the width direction orthogonal to the extending direction from a halfway position to a leading end of the power generating element connecting portion 601 in the extending direction thereof. In addition, in the power generating element connecting portion 601, the twisted portion 601d may be formed in one end portion of the insertion portion 601f in the extending direction of the power generating element connecting portion 601, and the twisted portion 601e may be formed in one end portion of the insertion portion 601g in the extending direction of the power generating element connecting portion 601.

That is, the positive-electrode current collecting member 6 illustrated in FIG. 7 is provided with an external terminal connecting portion (first portion) 600 connected to the positive-electrode external terminal 4, and a power generating element connecting portion (second portion) 601 extending out of the other end portion of the external terminal connecting portion 600 and connected to the power generating element 2. The power generating element connecting portion 601 is bent with respect to the external terminal connecting portion 600. The external terminal connecting portion 600 and the power generating element connecting portion 601 intersect with each other. In FIG. 7, the connecting portions intersect with each other at an angle of 90 or nearly 90 degrees.

The power generating element connecting portion 601 is provided with a base portion 601a connected to the other end portion of the external terminal connecting portion 600, a pair of twisted portions 601d and 601e connected abreast to the other end portion of the base portion 601a, and a pair of insertion portions 601f and 601g connected to the respective other end portions of the pair of twisted portions 601d and 601e.

Consequently, in the power generating element connecting portion, a combination of the twisted portion 601d and the insertion portion 601f constitutes one divided portion 601b, a combination of the twisted portion 601e and the insertion portion 601g constitutes the other divided portion 601c, and the one end portions of the pair of divided portions 601b and 601c are coupled with each other by the base portion 601a.

Since the power generating element connecting portion 601 is formed by processing a metal plate, the base portion 601a, the twisted portions 601d and 601e, and the insertion portions 601f and 601g each are of a plate-like shape. In addition, the twisted portions 601d and 601e are twisted at an angle of 90 or nearly 90 degrees. That is, the twisted portions 601d and 601e are twisted so that one end portion and the other end portion thereof intersect with each other at an angle of 90 or nearly 90 degrees. Accordingly, the base portion 601a and the insertion portions 601f and 601g are orthogonal or nearly orthogonal to each other.

The power generating element connecting portion 601 is arranged along a long axis direction (cross-sectional long axis direction) of the power generating element 2, and disposed so as to face an end face of the power generating element 2. Consequently, the base portion 601a of the power generating element connecting portion 601 faces the end face of the power generating element 2. More specifically, the base portion 601a faces the end face of the power generating element 2 in abutment or nearly in abutment with the end face or at a predetermined interval between the base portion 601a and the end face.

Also with such a configuration as described above, the insertion portions 601f and 601g of the positive-electrode current collecting member 6 are made easy to be inserted into the winding center 22a of the positive electrode plate 20a of the power generating element 2. Accordingly, it is possible to arrange a horn outside the power generating element 2, arrange an anvil in the winding center 22a of the power generating element 2, and ultrasonic-weld the power generating element 2 and the insertion portions 601f and 601g under the condition of the insertion portions 601f and 601g of the positive-electrode current collecting member 6 being inserted into the winding center 22a of the positive electrode plate 20a of the power generating element 2. Consequently, it is possible to increase the connection strength of the insertion portions 601f and 601g (positive-electrode current collecting member 6) and the power generating element 2. In addition, any portions (constrictions) narrower than the external terminal connecting portion 600 are not formed in a joint of the external terminal connecting portion 600 and the power generating element connecting portion 601. Consequently, the positive-electrode current collecting member 6 is free of cross sectional change throughout a path from the external terminal connecting portion 600 to the power generating element connecting portion 601, and therefore, does not vary in resistance. The negative-electrode current collecting member 7 may be the same in configuration as such a positive-electrode current collecting member 6 as described above (as illustrated in FIG. 7).

In addition, only one combination of the twisted portion 601d, the insertion portion 601f and the reverse-twisted portion 601d', rather than a pair of the combinations (embodiments illustrated in FIGS. 5, 6(a) and 6(b)), may be provided in the power generating element connecting portion (second portion) 601 of the positive-electrode current collecting member 6. Yet additionally, only one combination of the twisted portion 601d and the insertion portion 601f, rather than a pair of the combinations (embodiment illustrated in FIG. 7), may be provided in the power generating element connecting portion (second portion) 601 of the positive-electrode current collecting member 6. In other words, the power generating element connecting portion (second portion) 601 of the positive-electrode current collecting member 6 need not necessarily be provided with a pair of the divided portions 601b and 601c. The negative-electrode current collecting member 7 may be the same in configuration as such a positive-electrode current collecting member 6 as described above.

Still additionally, the external terminal connecting portion 600 and the power generating element connecting portion 601 of the positive-electrode current collecting member 6 may intersect with each other at an angle other than 90 or nearly 90 degrees. The negative-electrode current collecting member 7 may be the same in configuration as such a positive-electrode current collecting member 6 as described above.

Still additionally, the twisted portions 601d and 601e and the reverse-twisted portions 601d' and 601e' of the positive-electrode current collecting member 6 may be twisted at an angle other than 90 or nearly 90 degrees. In this case, the insertion portions 601*f* and 601*g* are not orthogonal or nearly orthogonal to the base portion 601*a* but are inclined therefrom. If this pair of insertion portions 601*f* and 601*g* is inclined so that the distance therebetween becomes narrower toward the power generating element 2, the pair of insertion portions 601*f* and 601*g* provides the same advantageous effect as a later-described pair of inclined portions 601*i* and 601*j*. The negative-electrode current collecting member 7 may be the same in configuration as such a positive-electrode current collecting member 6 as described above.

Still additionally, in the above-described embodiment, the twisted portions 601*d* and 601*e* and the reverse-twisted portions 601*d'* and 601*e'* of the positive-electrode current collecting member 6 are formed so as to be the same in length in the extending direction of the power generating element connecting portion 601 (in the longitudinal direction of a metal plate composing the positive-electrode current collecting member 6). The twisted portions 601*d* and 601*e* and the reverse-twisted portions 601*d'* and 601*e'* are not limited to this configuration, however. That is, the twisted portions 601*d* and 601*e* may be formed so as to be longer or shorter than the reverse-twisted portions 601*d'* and 601*e'* in the extending direction of the power generating element connecting portion 601. The negative-electrode current collecting member 7 may be the same in configuration as such a positive-electrode current collecting member 6 as described above.

Still additionally, in the above-described embodiment, the pair of twisted portions 601*d* and 601*e* of the positive-electrode current collecting member 6 are formed so as to be the same in length in the extending direction of the power generating element connecting portion 601. Likewise, in the above-described embodiment, the pair of reverse-twisted portions 601*d'* and 601*e'* of the positive-electrode current collecting member 6 is formed so as to be the same in length in the extending direction of the power generating element connecting portion 601. The pair of reverse-twisted portions 601*d'* and 601*e'* is not limited to this configuration, however. That is, one of the pair of twisted portions 601*d* and 601*e* may be formed longer or shorter than the other twisted portion. Likewise, one of the pair of reverse-twisted portions 601*d'* and 601*e'* may be formed longer or shorter than the other reverse-twisted portion. The negative-electrode current collecting member 7 may be the same in configuration as such a positive-electrode current collecting member 6 as described above.

Still additionally, in the above-described embodiment, the pair of divided portions 601*b* and 601*c* of the positive-electrode current collecting member 6 is formed so as to be the same in width in the width direction of the power generating element connecting portion 601 (in the width direction of a metal plate composing the positive-electrode current collecting member 6). The pair of divided portions 601*b* and 601*c* is not limited to this configuration, however. One of the pair of divided portions 601*b* and 601*c* may be formed larger or smaller in width than the other divided portion. The negative-electrode current collecting member 7 may be the same in configuration as such a positive-electrode current collecting member 6 as described above.

Still additionally, the positive-electrode current collecting member 6 and the negative-electrode current collecting member 7 may be different in configuration from each other. For example, the positive-electrode current collecting member 6 may be formed as illustrated in FIG. 5, and the negative-electrode current collecting member 7 may be formed as illustrated in FIG. 7, thus making the positive-electrode current collecting member 6 and the negative-electrode current collecting member 7 different in configuration from each other. Alternatively, either one of the positive-electrode current collecting member 6 and the negative-electrode current collecting member 7 may be a current collecting member having a conventional configuration.

Still additionally, the clip members 8 and 9 are not essential. In an ultrasonic welding process, it is possible to perform welding without using the clip members 8 and 9. However, use of the clip members 8 and 9 keeps a horn from coming into direct contact with the power generating element (metal foil) 2. Consequently, it is possible to prevent the metal foil portions (positive electrode plate 20*a* and negative electrode plate 20*b*) of the power generating element 2 from fracturing in the ultrasonic welding process. It is therefore preferable to use the clip members 8 and 9.

Still additionally, after the positive-electrode laminated portion 21*a* is caulked by the clip member 8, the insertion portions 601*f* and 601*g* may be inserted into the winding center 22*a* of the positive electrode plate 20*a* of the power generating element 2, so as to have contact with an outer surface of the clip member 8, and the place of contact may be ultrasonic-welded. The negative-electrode laminated portion 21*b* side may be configured in the same as such a positive-electrode laminated portion 21*a* side as described above.

Figure 8:
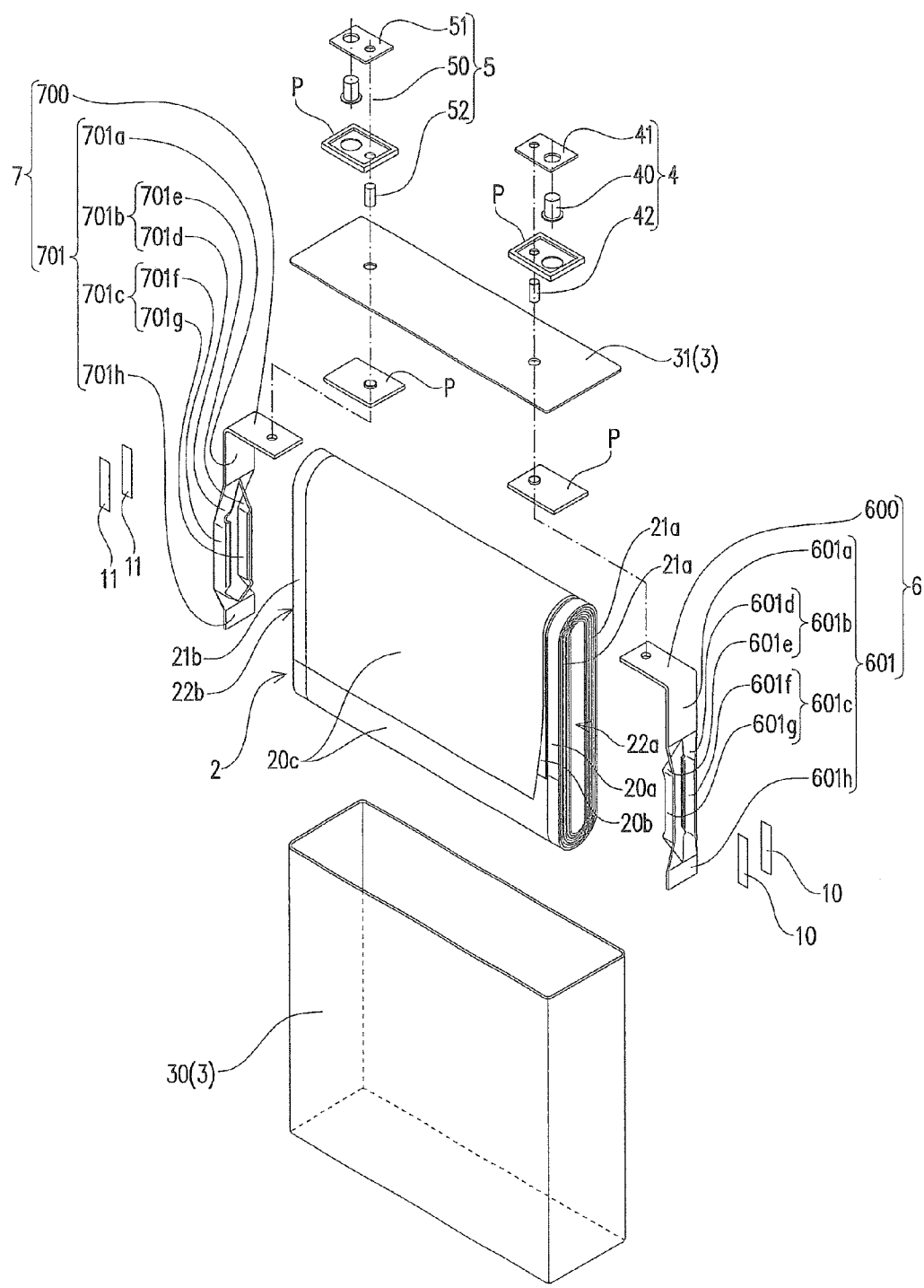
FIG. 8 is an exploded perspective view of a cell according to another embodiment of the present invention, wherein the cell uses a metal plate in place of a clip member.

Alternatively, as illustrated in FIG. 8, it is possible to use metal plates 10 and 11 as pad plates in the ultrasonic welding process, instead of using the clip members 8 and 9. The metal plates 10 and 11 are tabular and arranged on a side of the positive-electrode laminated portion 21*a* or the negative-electrode laminated portion 21*b* with which a horn has contact (outside the power generating element 2 in FIG. 8). That is, the horn, the metal plate 10, the positive-electrode laminated portion 21*a*, the positive-electrode current collecting member 6, and an anvil are arranged in this order from outside the power generating element 2 on the positive electrode plate 20*a* side, and an ultrasonic welding process is carried out. Likewise, the horn, the metal plate 11, the negative-electrode laminated portion 21*b*, the negative-electrode current collecting member 7, and the anvil are arranged in this order from outside the power generating element 2 on the negative electrode plate 20*b* side, and an ultrasonic welding process is carried out. The metal plates 10 and 11 may be of such a size as not to allow the horn to come into direct contact with the power generating element (metal foil) 2.

Incidentally, the cell 1' described in the foregoing Background Art paragraph is designed, in consideration of dimensional tolerances, the expansion of the power generating element 2', and the like, so that a gap is formed between the power generating element 2' and the cell case 3' in the vertical and width directions of the power generating element 2'. Accordingly, even if extraneous stress, such as vibration or impact, occurs in the cell 1' in the vertical direction of the power generating element 2', the breakage of the power generating element 2' due to wobbling caused by vibration or impact or expansion/contraction stress is less likely to occur. However, if the power generating element 2' and the current collecting members 6' and 7' (electrode assembly connecting portions 601' and 701') are ultrasonic-welded as described above, there is formed a structure in which the current collecting members 6' and 7' hang down from the power generating element 2'. That means that extraneous stress, such as vibration or impact, concentrates on the vicinity of a welded part between the power generating element 2' and the electrode assembly connecting portion 601', 701'. Accordingly, the positive electrode plate 20*a'* and the negative electrode plate 20*b'* of the power generating element 2' may bend in the vicinity of the current collecting members 6' and 7' (electrode assembly connecting portions 601' and 701'), and the bent portion may undergo great stress when the positive electrode plate 20a' and the negative electrode plate 20b' of the power generating element 2' are bundled. Consequently, the positive electrode plate 20a' and the negative electrode plate 20b' of the power generating element 2' may fracture in some cases. Accordingly, there is a demand for a current collecting member adapted not to fracture the positive electrode plate and the negative electrode plate of a power generating element, as well as a current collecting member capable of increasing the strength of connection with a power generating element. This is also true for a current collecting member in a capacitor (electric double layer capacitor, or the like).

Hence, as illustrated in FIGS. 9(a), 9(b), 10(a), 10(b) and 11, each of the pair of insertion portions 601f and 601g of the positive-electrode current collecting member 6 may be provided with an inclined surface inclined so as to approach a counterpart insertion portion on the leading end side thereof in the insertion direction. More specifically, at least an end portion of the pair of insertion portions 601f and 601g on the power generating element 2 side is bent toward a counterpart insertion portion to be formed into inclined portions 601i and 601j. Consequently, the other surfaces of at least end portions of the insertion portions 601f and 601g on the power generating element 2 side are inclined so as to be closer to counterpart insertion portions toward a side on which the power generating element 2 is arranged. Accordingly, the insertion portions 601f and 601g are easier to insert into the winding center 22a of the positive electrode plate 20a than the insertion portions 601f and 601g of the above-described embodiment.

In addition, if the inclined portion 601i is provided in one insertion portion 601f and the inclined portion 601j is provided in the other insertion portion 601g, an anvil is not inserted further inward beyond the positions of those inclined portions. Accordingly, the anvil is not inserted too deep into the winding center 22a of the positive electrode plate 20a of the power generating element 2. Thus, there is no possibility of the winding center 22a of the positive electrode plate 20a of the power generating element 2 becoming damaged and causing internal short-circuits. As described above, the inclined portions 601i and 601j can also be utilized in the positioning of an anvil in the winding center 22a of the positive electrode plate 20a. The negative-electrode current collecting member 7 may be configured in the same way as such a positive-electrode current collecting member 6 as described above (as illustrated in each of FIGS. 9(a), 9(b), 10(a), 10(b) and 11).

Figure 9A:
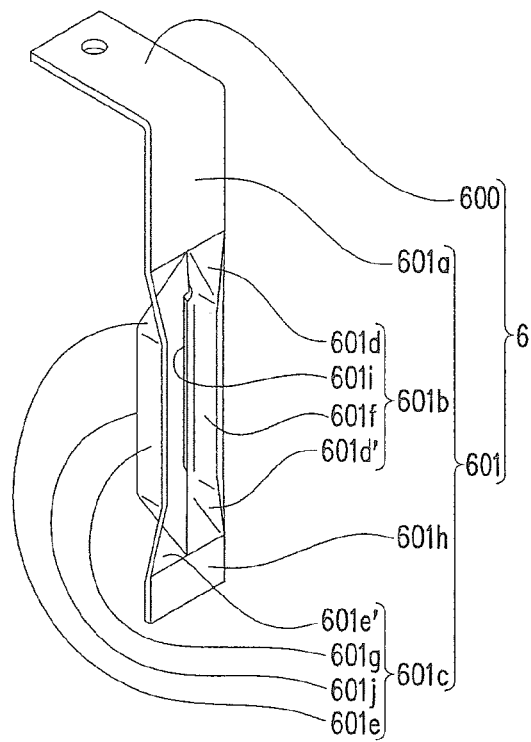
Figure 9B:
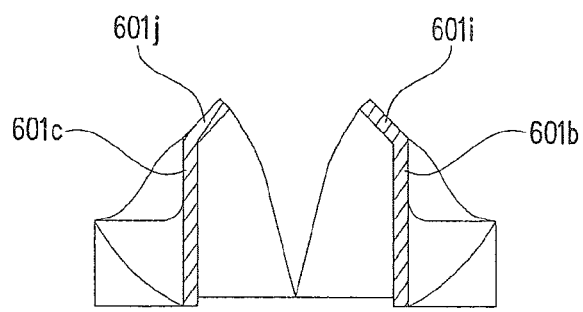
Figure 10A:
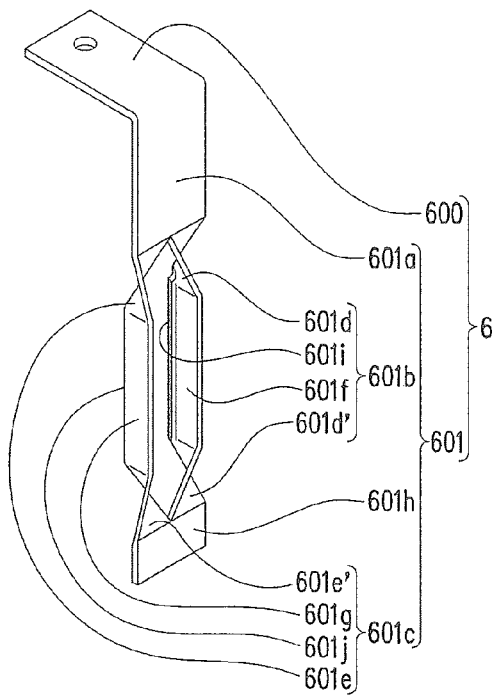
Figure 10B:
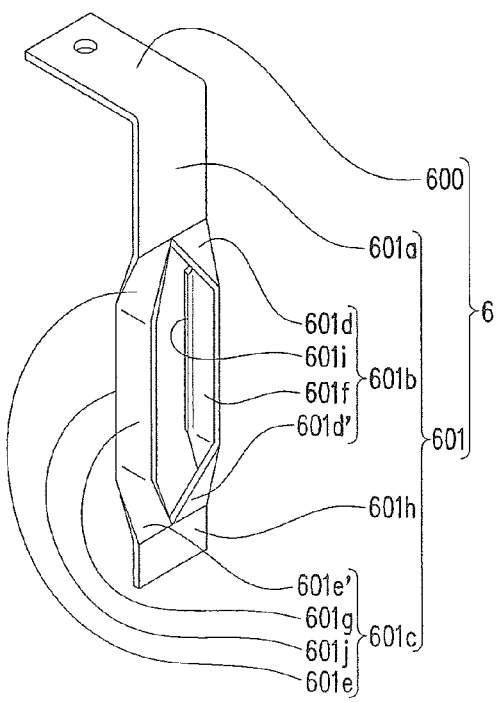
Figure 11:
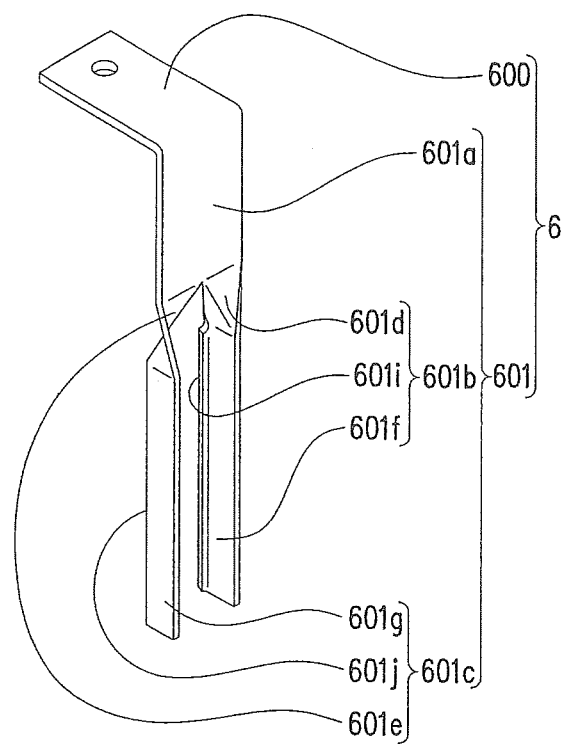
FIG. 11 illustrates a modified example of the current collecting member illustrated in FIG. 7.
Figure 13:
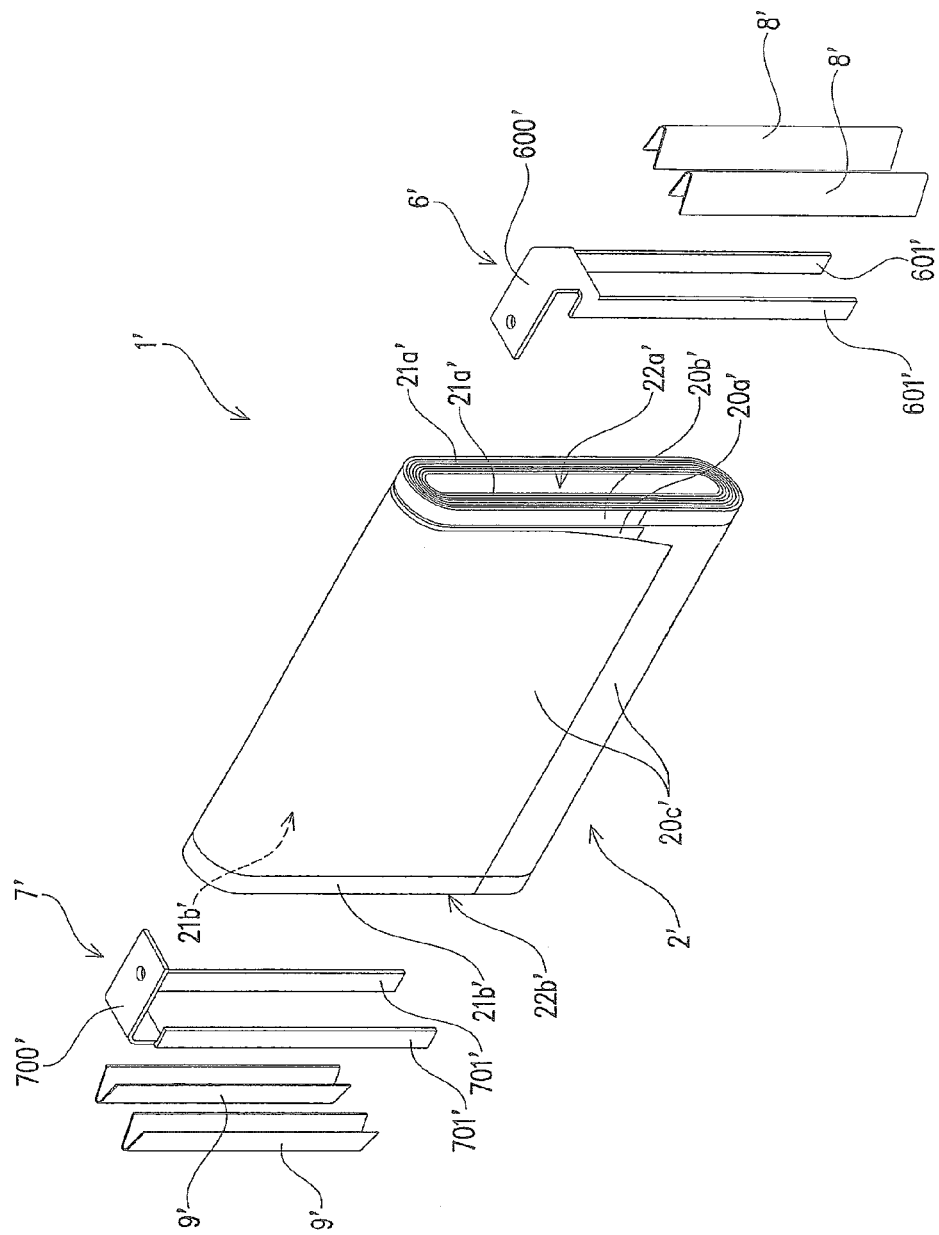
FIG. 13 is an exploded perspective view illustrating a coupling structure of a power generating element and a current collecting member according to the conventional cell.

Note that the positive-electrode current collecting member 6 illustrated in FIGS. 9(a) and 9(b) corresponds to the positive-electrode current collecting member 6 illustrated in FIG. 5. The positive-electrode current collecting member 6 illustrated in FIG. 10(a) corresponds to the positive-electrode current collecting member 6 illustrated in FIG. 6(a). The positive-electrode current collecting member 6 illustrated in FIG. 10(b) corresponds to the positive-electrode current collecting member 6 illustrated in FIG. 6(b). The positive-electrode current collecting member 6 illustrated in FIG. 11 corresponds to the positive-electrode current collecting member 6 illustrated in FIG. 7.

REFERENCE SIGNS LIST

1: Cell (electric storage device), 2: Power generating element (electrode assembly), 3: Cell case (case), 4: Positive-electrode external terminal (external terminal), 5: Negative-electrode external terminal (external terminal), 6: Positive-electrode current collecting member (current collecting member), 7: Negative-electrode current collecting member (current collecting member), 8, 9: Clip member, 10, 11: Metal plate, 20a: Positive electrode plate, 20b: Negative electrode plate, 20c: Separator, 21a: Laminated portion of positive electrode plate, 21b: Laminated portion of negative electrode plate, 22a: Winding center of positive electrode plate, 22b: Winding center of negative electrode plate, 31: Cover plate, 40, 50: Terminal part, 41, 51: Connecting fitting, 42, 52: Rivet (connecting means), 600, 700: External terminal connecting portion (first portion), 601, 701: Power generating element connecting portion (electrode assembly connecting portion, second portion), 601a, 701a: Base portion, 601b, 601c, 701b, 701c: Divided portion, 601d, 601e, 701d, 701e: Twisted portion, 601d', 601e', 701d', 701e': Reverse-twisted portion, 601f, 601g, 701f, 701g: Insertion portion, 601h, 701h: Leading end portion, 601i, 601j, 701i, 701j: Inclined portion (inclined surface), 80a, 80b: Opposed piece, A: Positive-electrode coated region, B: Negative-electrode coated region, L1: Positive-electrode lead portion, L2: Negative-electrode lead portion, P: Insulating gasket

The invention claimed is:
1. An electric storage device, comprising:
a case;
an electrode assembly housed in the case and including a positive electrode plate and a negative electrode plate which are wound together while being isolated from each other;
an external terminal arranged outside the case; and
a current collecting member arranged inside the case to electrically connect the electrode assembly with the external terminal,
wherein the current collecting member comprises:
a first portion including a first end portion and a second end portion, and electrically connected to the external terminal; and
a second portion extending out of the second end portion of the first portion and electrically connected to the electrode assembly,
wherein the second portion comprises:
a base portion including a first end portion and a second end portion, the first end portion of the base portion being connected to the second end portion of the first portion;
a pair of twisted portions, each twisted portion comprising a helically twisting structure, the twisted portion including a first end portion and a second end portion, the first end portion of the twisted portion being connected to the second end portion of the base portion; and
a pair of insertion portions provided at an interval, each insertion portion including a first end portion and a second end portion, the first end portion of the insertion portion being connected to the second end portion of the twisted portion, the insertion portion being inserted into a winding center of the electrode assembly and electrically connected to the electrode assembly, and
wherein each of the pair of insertion portions comprises, on a leading end side of the insertion portion in an insertion direction thereof, an inclined surface inclined so as to approach a counterpart insertion portion.

2. The electric storage device according to claim 1, wherein the twisted portion is twisted at an angle of 90 degrees or approximately 90 degrees, so that the base portion and the insertion portion are orthogonal or nearly orthogonal to each other.

3. The electric storage device according to claim 1, wherein the current collecting member is arranged so that the base portion faces an end face of the electrode assembly.

4. An electric storage device, comprising:
a case;
an electrode assembly in which a positive electrode plate and a negative electrode plate are flatly wound, while being isolated from each other, and housed in the case;
a pair of external terminals provided for external connection; and
a pair of current collecting members arranged along an inner surface of the case to electrically connect the electrode assembly with each of the pair of external terminals,
wherein at least one of the pair of current collecting members includes an external terminal connecting portion arranged along the inner surface of the case, and an electrode assembly connecting portion extending out of an end portion of the external terminal connecting portion and connected to a laminated portion of the positive electrode plate or a laminated portion of the negative electrode plate of the electrode assembly, and is a current collecting member in which the external terminal connecting portion and the electrode assembly connecting portion are integrally formed by processing a metal plate,
wherein the electrode assembly connecting portion is divided in a width direction thereof orthogonal to the extending direction thereof, thereby forming in the electrode assembly connecting portion a pair of divided portions,
wherein each of the pair of divided portions comprises:
a twisted portion helically twisted in the width direction of the electrode assembly connecting portion; and
an insertion portion provided in continuity with the twisted portion,
wherein the insertion portion is formed so that surfaces of the insertion portions face each other, and is inserted into a winding center of the positive electrode plate or the negative electrode plate of the electrode assembly, and
wherein the insertion portion is electrically connected to the laminated portion of the positive electrode plate or the laminated portion of the negative electrode plate of the electrode assembly.

5. The electric storage device according to claim 1, wherein the second portion extends out along a plane connecting the first end portion and the second end portion of the first portion.

6. The electric storage device according to claim 5, wherein the second portion is bent with respect to the first portion.

7. The electric storage device according to claim 1, wherein the first portion and the second portion are integrally formed by processing a metal plate,
wherein the second portion is divided in a width direction thereof orthogonal to the extending direction thereof, thereby forming in the second portion a pair of divided portions, and
wherein each of the pair of divided portions includes the twisted portion and the insertion portion.

8. The electric storage device according to claim 1, wherein the positive electrode plate includes a positive-electrode lead portion formed in one end portion thereof in a width direction of the electrode assembly,
wherein the negative electrode plate has a negative-electrode lead portion formed in one end portion thereof in the width direction of the electrode assembly,
wherein the positive-electrode lead portion protrudes outward from the other end portion of the negative electrode plate in the width direction of the electrode assembly,
wherein the negative-electrode lead portion protrudes outward from the other end portion of the positive electrode plate in the width direction of the electrode assembly, and
wherein the current collecting member comprises a positive-electrode current collecting member to be connected to the positive-electrode lead portion and a negative-electrode current collecting member to be connected to the negative-electrode lead portion.

* * * * *